United States Patent
Hyodo et al.

(10) Patent No.: US 8,744,702 B2
(45) Date of Patent: Jun. 3, 2014

(54) WORK VEHICLE CONTROL DEVICE

(75) Inventors: Koji Hyodo, Kasumigaura (JP); Masaki Yoshikawa, Kasama (JP); Ei Takahashi, Ushiku (JP); Katsutaka Hara, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 105 days.

(21) Appl. No.: 13/378,967

(22) PCT Filed: Jun. 18, 2010

(86) PCT No.: PCT/JP2010/060372
§ 371 (c)(1),
(2), (4) Date: Dec. 16, 2011

(87) PCT Pub. No.: WO2010/147211
PCT Pub. Date: Dec. 23, 2010

(65) Prior Publication Data
US 2012/0089307 A1    Apr. 12, 2012

(30) Foreign Application Priority Data
Jun. 19, 2009  (JP) ................................ 2009-146199

(51) Int. Cl.
G06F 7/02           (2006.01)
(52) U.S. Cl.
USPC ........................................... 701/52; 701/102
(58) Field of Classification Search
USPC .................................................. 701/52, 102
See application file for complete search history.

(56) References Cited

U.S. PATENT DOCUMENTS

| 6,165,102 A | 12/2000 | Bellinger |
| 6,574,541 B2 * | 6/2003 | Katakura et al. ................. 701/54 |
| 7,543,447 B2 * | 6/2009 | Itoga et al. ....................... 60/431 |

FOREIGN PATENT DOCUMENTS

| JP | 4-208658 A | 7/1992 |
| JP | 4-366729 A | 12/1992 |
| JP | 2003-278573 A | 10/2003 |
| JP | 2008174150 A * | 7/2008 |
| JP | 4892491 B * | 12/2011 |
| WO | WO 2007/072701 A1 | 6/2007 |

OTHER PUBLICATIONS

International Search Report dated Aug. 10, 2010 (One (1) page.).

* cited by examiner

*Primary Examiner* — Mary Cheung
*Assistant Examiner* — Michael Berns
(74) *Attorney, Agent, or Firm* — Crowell & Moring LLP

(57) ABSTRACT

A work vehicle control device includes: a rotation speed control unit that controls an engine rotation speed in correspondence to an accelerator pedal operation quantity indicating an operating extent of an accelerator pedal; a speed ratio detection unit that detects a ratio of speed at an input shaft and at an output shaft of a torque converter, which is disposed between the engine and wheels; a decision-making unit that makes a decision that a fuel efficiency deteriorating condition exists if the torque converter speed ratio is less than a predetermined value or if the torque converter speed ratio is equal to or greater than the predetermined value and a target engine rotation speed corresponding to an operation of the accelerator pedal is greater than a preset value; and an informing unit that informs results of the decision made by the decision-making unit.

9 Claims, 10 Drawing Sheets

(a)

(b)

WORK VEHICLE CONTROL DEVICE

TECHNICAL FIELD

The present invention relates to a work vehicle control device that controls a work vehicle equipped with a torque converter, such as a wheel loader.

BACKGROUND ART

There are devices known in the related art that prompt an operator driving a vehicle to operate the vehicle in a manner that improves fuel efficiency (see, for instance, patent literature 1). The device disclosed in patent literature 1 compares the actual fuel consumption with a specific target value and issues an alarm if the real fuel consumption is judged to be greater than the target value. The real fuel consumption is calculated by dividing the fuel consumption quantity by the traveling distance over which the vehicle has traveled.

CITATION LIST

Patent Literature

Patent Literature 1: Japanese Laid Open Patent Publication H4-366729

SUMMARY OF THE INVENTION

Technical Problem

However, since a work vehicles such as a wheel loader is engaged in work as it travels, it is difficult to improve fuel efficiency throughout the overall work operation simply through high-efficiency operation that is prompted in reference to the real fuel consumption calculated by dividing the fuel consumption quantity by the traveling distance.

According to the 1st aspect of the present invention, a work vehicle control device comprises: a rotation speed control unit that controls a rotation speed of an engine in correspondence to an accelerator pedal operation quantity indicating an extent to which an accelerator pedal is operated; a speed ratio detection unit that detects a speed ratio of a speed at an input shaft and a speed at an output shaft of a torque converter, which is disposed between the engine and wheels to transmit rotation of the engine to the wheels; a decision-making unit that makes a decision that a fuel efficiency deteriorating condition exists if the torque converter speed ratio detected via the speed ratio detection unit is less than a predetermined value or if the torque converter speed ratio detected via the speed ratio detection unit is equal to or greater than the predetermined value and a target engine rotation speed corresponding to an operation of the accelerator pedal is greater than a preset value; and an informing unit that informs results of the decision made by the decision-making unit.

According to the 2nd aspect of the present invention, in the work vehicle control device according to the 1st aspect, it is preferred that the informing unit includes a display device at a location within an operator's cab, that displays the results of the decision made by the decision-making unit.

According to the 3rd aspect of the present invention, in the work vehicle control device according to the 1st or the 2nd aspect, it is preferred that the decision-making unit makes the decision that the fuel efficiency deteriorating condition exists if a state in which the torque converter speed ratio remains less than the predetermined value is sustained over a period of time equal to or longer than a predetermined time length or if a state in which the torque converter speed ratio is equal to or greater than the predetermined value and the target engine rotation speed remains higher than the preset value is sustained over a period of time equal to or greater than a predetermined time length.

According to the 4th aspect of the present invention, in the work vehicle control device according to any one of the 1st through the 3rd aspects, it is preferred that: the work vehicle control device further comprises an automatic gear shift control unit that adjusts a gear setting at a transmission in correspondence to the speed ratio detected by the speed ratio detection unit, over a range in which a gear larger than first gear is set as a minimum gear, and a manual gear shift control unit that adjusts the gear setting at the transmission in response to a manual operation over a range that includes first gear and larger gears; and the automatic gear shift control unit shifts down the gear setting if the torque converter speed ratio decreases to a downshift reference value that is greater than the predetermined value.

Advantageous Effect of the Invention

According to the present invention, if the torque converter speed ratio is less than a predetermined value or if the torque converter speed ratio is equal to or greater than the predetermined value and the target engine rotation speed, indicated by the accelerator pedal operation position, is greater than a preset value, it is decided that a fuel efficiency deteriorating condition exists and the decision-making results are reported to the operator. As a result, the operator is prompted to operate the work vehicle with better fuel efficiency throughout the entire work operation.

DESCRIPTION OF EMBODIMENTS

First Embodiment

In reference to FIGS. 1 through 9, the work vehicle control device achieved in the first embodiment of the present invention is described.

Figure 1:
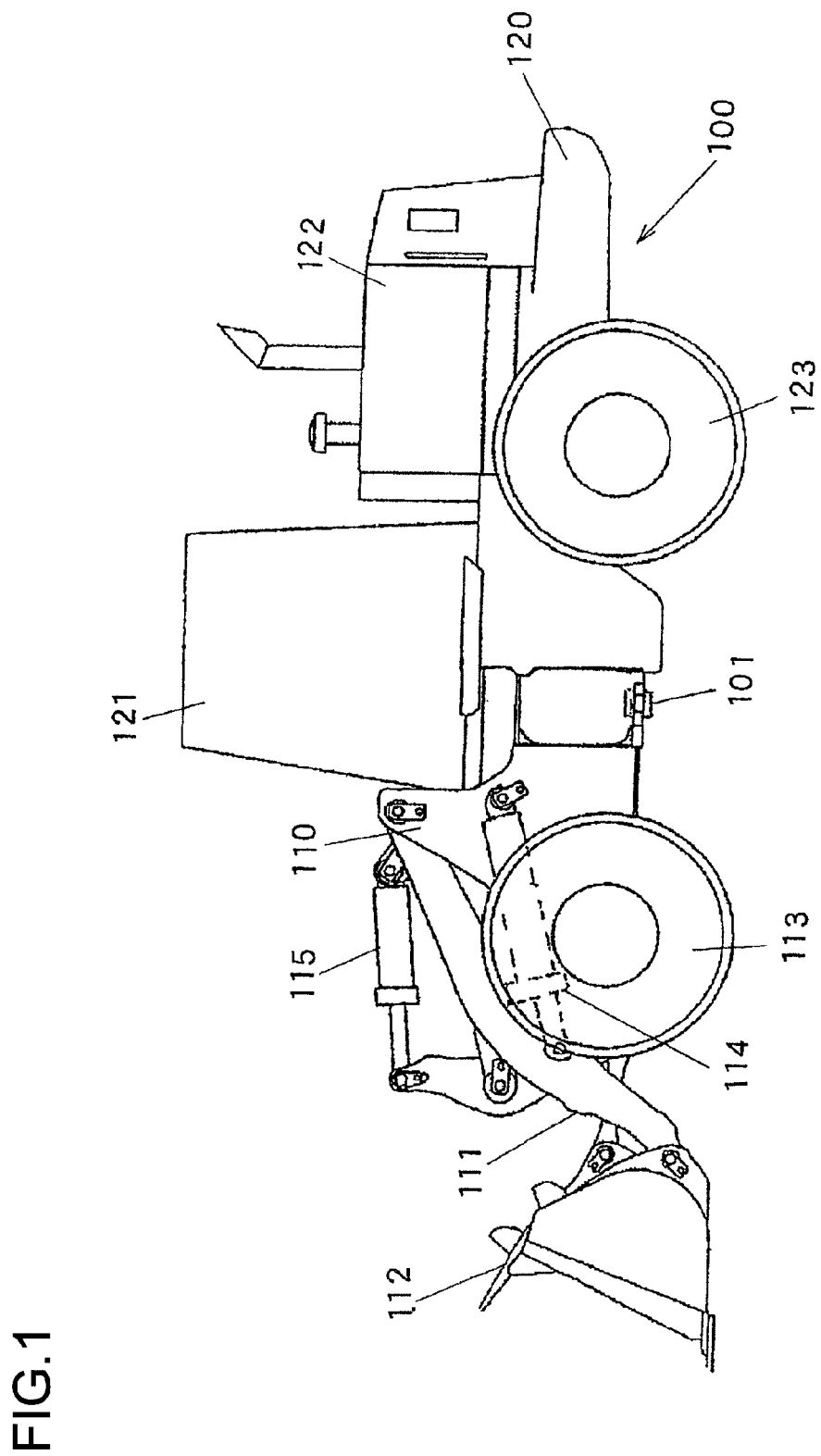
FIG. 1 A side elevation of a wheel loader representing an example of a work vehicle pertaining to an embodiment of the present invention FIG. 2 A schematic block diagram of the control device achieved in the embodiment of the present invention FIG. 3 A plan view of the interior of the operator's cab provided in (a) and a front view of the operation levers provided in (b)

FIG. 1 is a side elevation of a wheel loader, representing an example of a work vehicle in conjunction with which the control device achieved in the embodiment may be adopted. A wheel loader 100 is constituted with a front body 110 at which an arm 111, a bucket 112, tires 113, and the like are disposed and a rear body 120, at which an operator's cab 121, an engine room 122, tires 123 and the like are disposed. The arm 111 swings up/down (ascends/descends) as an arm cylinder 114 is driven, whereas the bucket 112 swings up/down (crowds/dumps) as a bucket cylinder 115 is driven. The front body 110 and the rear body 120 are linked via a center pin 101 so as to be allowed to rotate relative to each other and, as a steering cylinder (not shown) extends/contracts, the front body 110 swivels to the left/right relative to the rear body 120.

Figure 2:
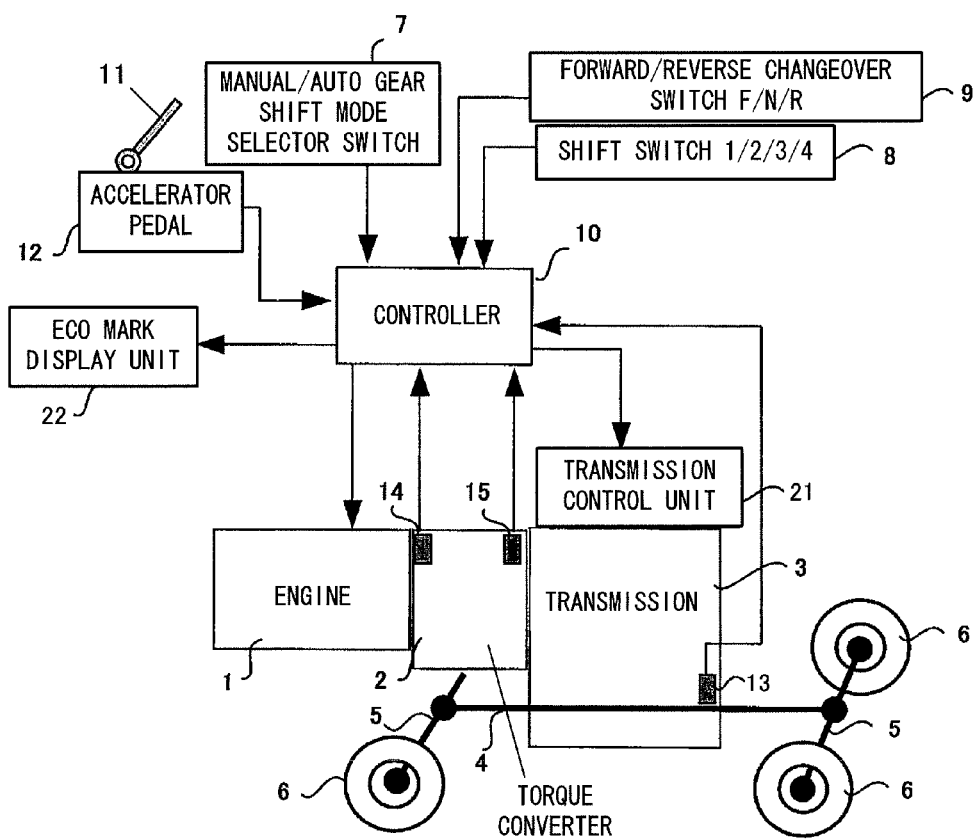
Figure 3:
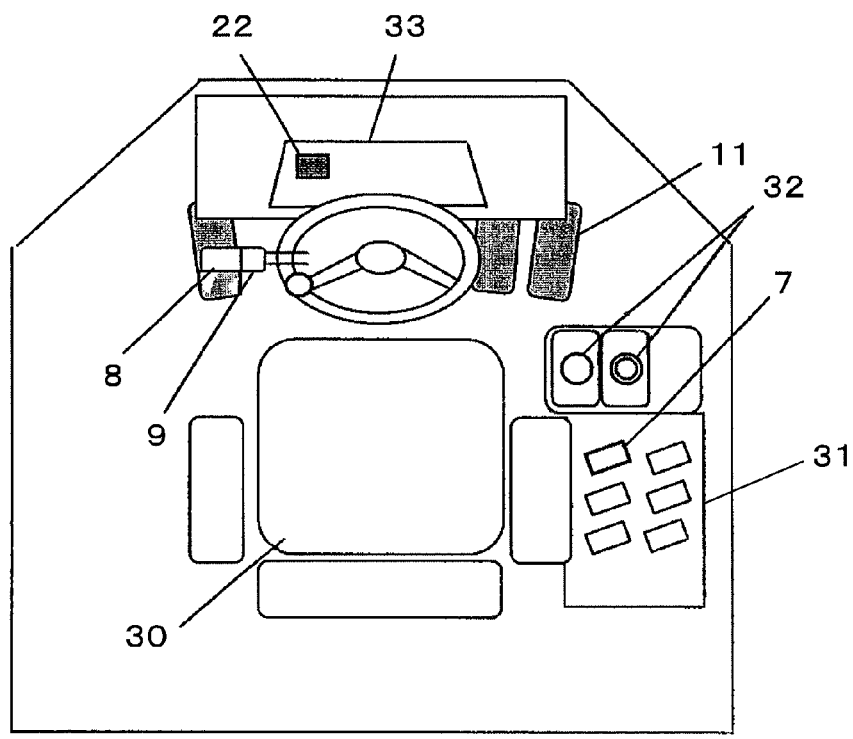
Figure 3:
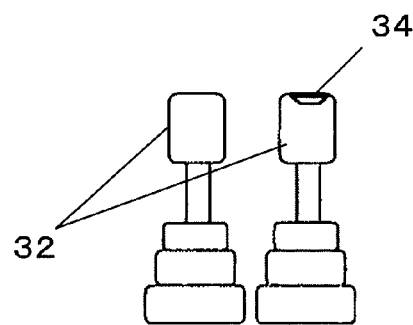

FIG. 2 schematically illustrates the structure of the control device achieved in the embodiment. An input shaft of a torque converter 2 is connected to an output shaft of an engine 1, whereas an output shaft of the torque converter 2 is connected to a transmission 3. The torque converter 2 is a fluid clutch constituted with an impeller, a turbine and a stator of the known art, and the rotation of the engine 1 is transmitted to the transmission 3 via the torque converter 2. The transmission 3 includes a fluid clutch via which its gear setting is shifted, and the rotation speed of the output shaft of the torque converter 2 is altered via the transmission 3. The rotation, the speed of which has been altered, is transmitted to tires 6 (the tires 113 and 123 in FIG. 1) via a drive shaft 4 and axles 5, thereby engaging the vehicle in traveling operation. It is to be noted that although not shown, a work hydraulic pump, which is driven by the engine 1, is connected to the output shaft of the engine 1. Pressure oil is delivered from the work hydraulic pump to a work actuator (such as the aim cylinder or the like) in a quantity corresponding to the extent to which an operation lever is operated and the work actuator is driven with the pressure oil delivered from the hydraulic pump.

A controller 10 includes an arithmetic processing device constituted with a CPU, a ROM, a RAM and other peripheral circuits. Signals provided by an operation quantity detector 12 that detects an operation quantity S indicating the extent to which an accelerator pedal 11 is operated, a vehicle speed detector 13 that detects the rotation speed of the output shaft of the transmission 3, i.e., the vehicle speed, a rotation speed detector 14 that detects a rotation speed Ni at the input shaft of the torque converter 2, a rotation speed detector 15 that detects a rotation speed Nt at the output shaft of the torque converter 2, the shift mode selector switch 7 that selects either a manual shift mode, in which gears are shifted manually, or an automatic shift mode, in which gears are shifted automatically, a shift switch 8 via which an upper limit gear setting for the automatic gear shift mode is specified and a gear setting for the manual gear shift mode is specified, and a forward/reverse changeover switch 9 that issues a forward/reverse command for the vehicle, are input to the controller 10.

FIG. 3(a) shows the interior of the operator's cab in a plan view. The gear shift mode selector switch 7 is disposed at a side console panel 31 located to the right of a driver's seat 30. To the front of the side console panel 31, a pair of operation levers 32, via which work actuator drive commands are input, are disposed. To one side of the steering wheel, the shift switch 8 and the forward/reverse changeover switch 9 are disposed. A monitor panel 33 is disposed to the front of the driver's seat 30, includes an ECU (ecological operation) mark display unit 22 used to indicate whether or not the vehicle is currently engaged in energy-saving operation (eco-friendly operation). An ECO mark is displayed at the ECO mark display unit 22 when the vehicle is engaged in eco-friendly operation, whereas the ECO mark is not displayed in the ECO mark display unit 22 when the vehicle is engaged in operation other than the eco-friendly operation. As shown in FIG. 3(b), a momentary-type kick-down switch 34, via which a manual downshift command is issued, is disposed at the top of the handle of an operation lever 32.

The torque converter 2 has a function of increasing the output torque relative to the input torque, i.e., a function of achieving a torque ratio of 1 or more. The torque ratio assumes a smaller value as a torque converter speed ratio e (output rotation speed Nt/input rotation speed Ni), representing the ratio of the rotation speed of the input shaft and the rotation speed of the output shaft of the torque converter 2, increases. For instance, as the traveling load increases while the vehicle is traveling at a steady engine rotation speed, the output rotation speed Nt of the torque converter 2, i.e., the vehicle speed decreases, and the torque converter speed ratio e, too, decreases. Under these circumstances, the torque ratio increases, which allows the vehicle to travel with a greater drive force (tractor force).

The transmission 3 is an automatic gear shift unit that includes solenoid valves disposed each in correspondence to one of the various gear settings, first through fourth gears. These solenoid valves are driven by a control signal output from the controller 10 to a solenoid control unit 21. In other words, as a control signal (an upshift signal or a downshift signal) is output from the controller 10, the solenoid control unit 21 outputs a control signal corresponding to the control signal to the solenoid valves so as to drive the solenoid valves. Through this control, the gear setting is automatically adjusted to a setting in the second through fourth gear range in the automatic gear shift mode. It is to be noted that the first gear cannot be automatically switched to the second gear or vice versa. In other words, the gear setting can be shifted from first gear to second gear or vice versa only manually.

Automatic gear shift control may be executed either by adopting a torque converter speed ratio-based control method, whereby a gear shift is effected when the torque converter speed ratio e reaches a predetermined value or a vehicle speed-based control method whereby a gear shift is effected when the vehicle speed reaches a predetermined value. The embodiment is described by assuming that the gear setting at the transmission 3 is controlled through the torque converter speed ratio-based control method.

Figure 4:
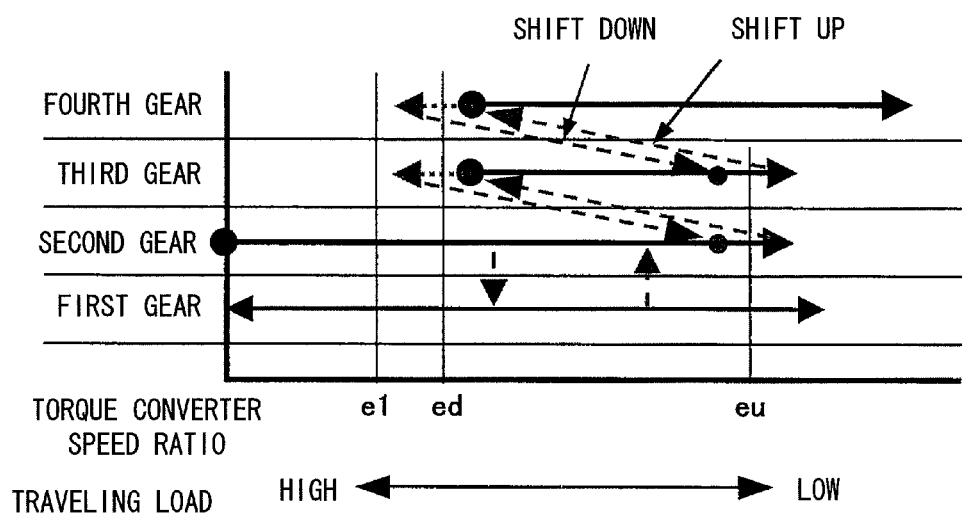
FIG. 4 A diagram indicating the gear shift timing with which gears are shifted in reference to the torque converter speed ratio FIG. 5 A graph indicating the relationship between the torque converter speed ratio and the torque converter efficiency FIG. 6 A diagram indicating the relationship between the vehicle speed at each gear setting and the traveling drive force FIG. 7 A diagram indicating the relationship between the accelerator pedal operation position and the target engine rotation speed FIG. 8 A diagram indicating the torque characteristics achieved via the control device in the embodiment FIG. 9 A flowchart of an example of processing that may be executed by the controller in FIG. 2

FIG. 4 is a diagram indicating the gear shift timing with which the gear shift is effected under torque converter speed ratio-based control. As the traveling load becomes lower and the torque converter speed ratio e increases to a value equal to or greater than a predetermined specific value eu, an upshift signal is output by the controller 10. As a result, a gear setting shifts up by one stage, resulting in a reduction in the torque converter speed ratio e. In contrast, as the traveling load increases and the torque converter speed ratio e decreases to a value equal to or less than a predetermined specific value ed, the controller outputs a downshift signal. In response, the gear setting shifts down by one stage to result in an increase in the torque converter speed ratio e.

The automatic gear shift in the embodiment is executed by designating the gear setting selected via the shift switch 8 as the upper limit. For instance, if third gear is selected via the shift switch 8, the gear setting is switched to second gear or third gear, whereas if second gear is selected via the shift switch 8, the gear setting remains fixed at second gear. If first gear is selected via the shift switch 8, or if the kick-down switch 34 is operated while in second gear, the gear setting is switched to first gear.

Figure 5:
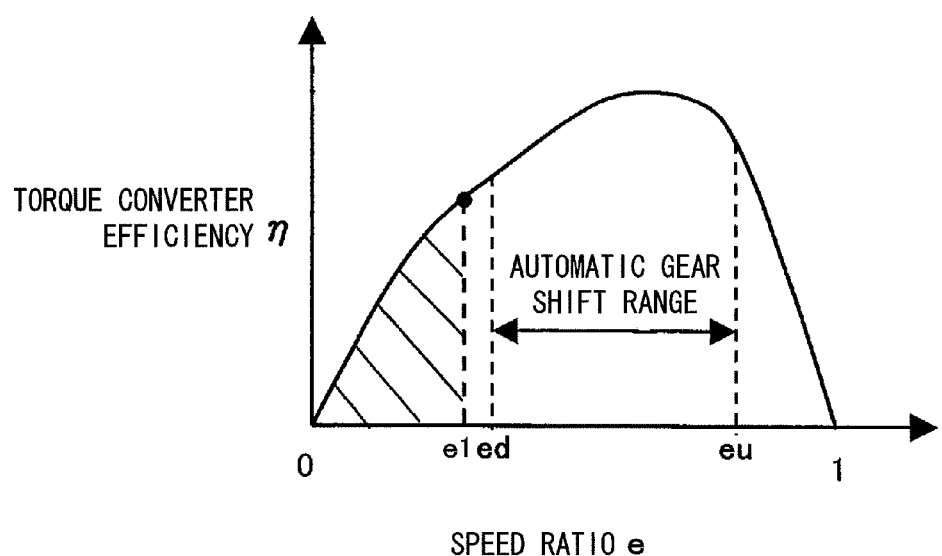

FIG. 5 indicates the relationship between the torque converter speed ratio e and the torque converter efficiency. As FIG. 5 indicates, the torque converter efficiency characteristics are represented by a substantially parabolic curve and the efficiency η becomes poorer when the torque converter speed ratio e takes on a value close to 0 or close to 1. In the embodiment, the specific values ed and eu are selected so as to execute automatic gear shift over a range within which the torque converter efficiency η assumes relatively large values. In addition, a predetermined speed ratio value e1 (<ed) is set, and if the torque converter speed ratio e becomes less than the predetermined value e1, a control signal is output to the ECO mark display unit 22 so as to warn the operator that the vehicle is currently operating with poor fuel efficiency. It is to be noted that when the torque converter efficiency η is poor, the fuel efficiency is compromised and furthermore, since the fuel consumption quantity is large, the engine cooling water temperature and the torque converter oil temperature rise, leading to a condition in which overheating occurs readily.

Figure 6:
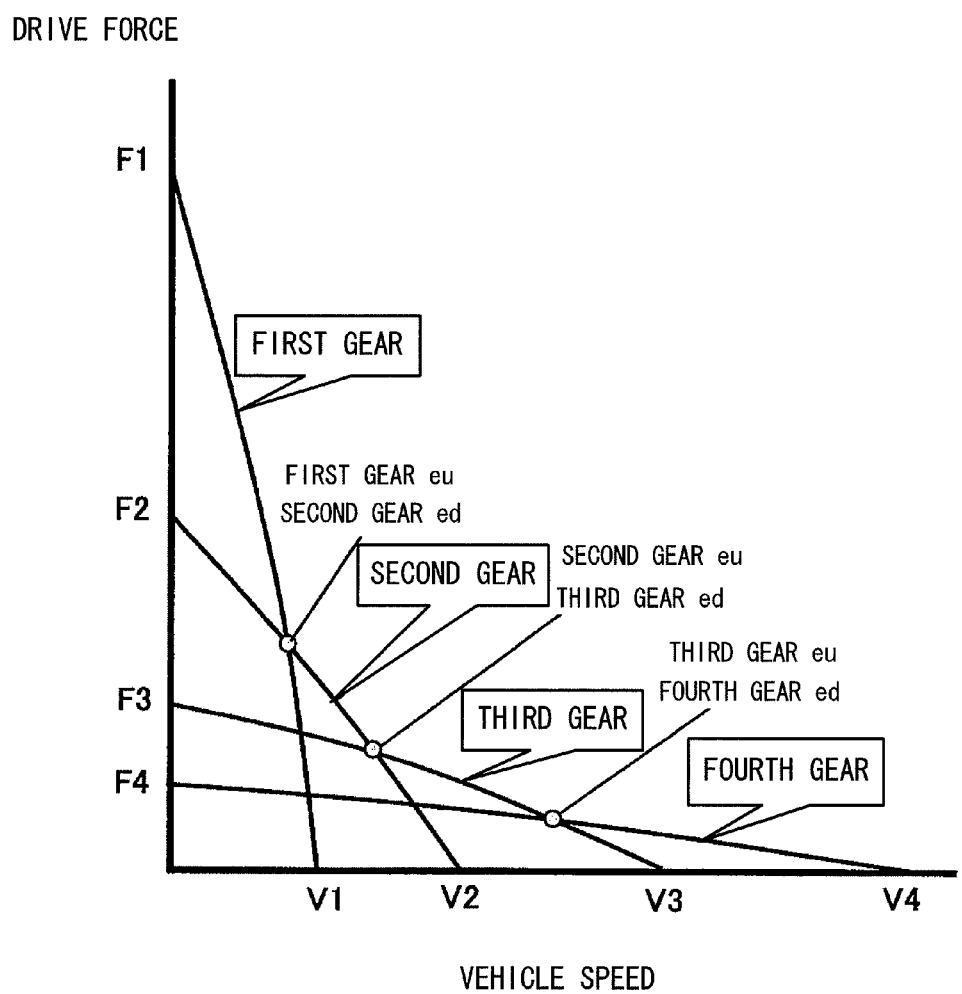

The relationship between the vehicle speed at each gear setting and the drive force is indicated in FIG. 6. As FIG. 6 clearly shows, at any given gear setting, greater drive force is imparted at a lower vehicle speed (low speed and high torque) and the drive force decreases at a higher vehicle speed (high-speed and low torque). In addition, at a given vehicle speed, greater drive force can be achieved at a lower gear setting. The point at which the lines representing the second gear characteristics and the third gear characteristics intersect and the point at which the lines representing the third gear characteristics and the fourth gear characteristics intersect are gear shift points. The predetermined values ed and eu in FIG. 4 are set at these intersection points. As a result, smooth gear shift operation with a minimum of shift shock is enabled. It is to be noted that while automatic gear shift is executed over the range, with the lower limit thereof is set at second gear in the embodiment, first gear may also be included in the automatic gear shift range, and in such a case, predetermined values ed and eu should also be set at the intersection point where the lines representing the first gear characteristics and the second gear characteristics intersect, as shown in the figure.

Figure 7:
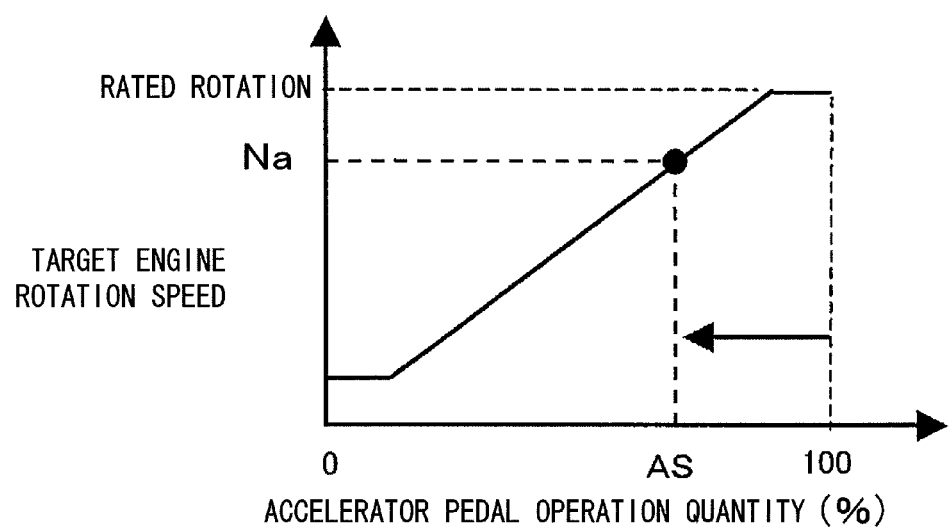

FIG. 7 is a diagram indicating the relationship between the operation quantity representing the extent to which the accelerator pedal 11 has been operated, and the target engine rotation speed. As the operation quantity at the accelerator pedal 11 increases, the target engine rotation speed rises, and a rated rotation is achieved at the target engine rotation speed corresponding to the maximum accelerator pedal operation quantity. The controller 10 outputs a control signal corresponding to the target engine rotation speed to an engine control unit, so as to execute control under which the engine rotation speed is adjusted to the target engine rotation speed.

In the embodiment, a threshold value Na (e.g., 80% of the rated rotation speed) to be used as an energy-saving operation reference value, is set in advance so as to prompt the operator to drive the engine 1 at a desirable fuel consumption rate. The pedal operation quantity AS corresponding to the threshold value Na and the actual pedal operation quantity S are compared with each other and the operator is advised to execute energy-saving operation depending upon the comparison results. Control is executed by taking into consideration the torque converter efficiency η as well, as described later.

Figure 8:
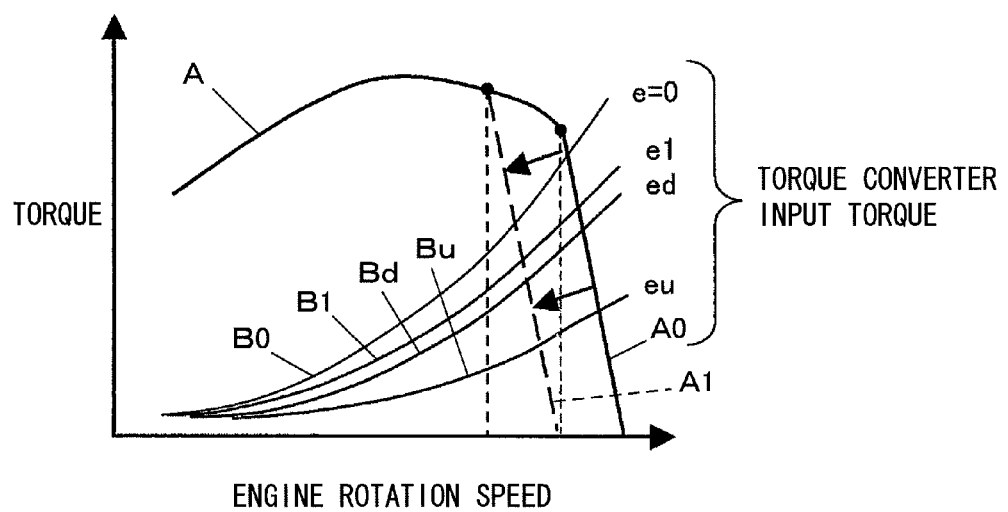

FIG. 8 is a traveling performance diagram (torque diagram) indicating the relationship between the engine rotation speed and the torque. Characteristics A in the figure are engine output torque characteristics. More specifically, a characteristics curve A0 represents the engine output torque characteristics manifesting when the engine rotates at the rated rotation speed with the accelerator pedal 11 operated to the maximum extent and a characteristics curve A1 represents the engine output torque characteristics manifesting when the pedal is operated to an extent equivalent to the threshold value AS. The characteristics A1 are equivalent to characteristics achieved by shifting the characteristics A0 toward the lower speed side.

Curves B0, B1, Bd and Bu in FIG. 8 each indicate the torque input to the transmission 3 (transmission torque) when the torque speed ratio e is equal to 0, e1, ed and eu respectively. Each transmission torque increases as the engine rotation speed N rises. In addition, the transmission torque becomes lower as the torque converter speed ratio e takes on a greater value.

The intersection points at which the characteristics curves A0 and A1 and the characteristics curves B0, B1, Bd and Bu intersect are matching points and the engine rotation speed is represented by the value assumed at a matching point. As the target engine rotation speed is lowered from the rated rotation speed to the threshold value Na, the maximum vehicle speed and the acceleration performance at each gear setting are suppressed by the extent corresponding to the decrease in the engine rotation speed. This means that energy-saving operation can be achieved if the operator ensures that the accelerator pedal operation quantity is kept equal to or less than the preset value AS.

Figure 9:
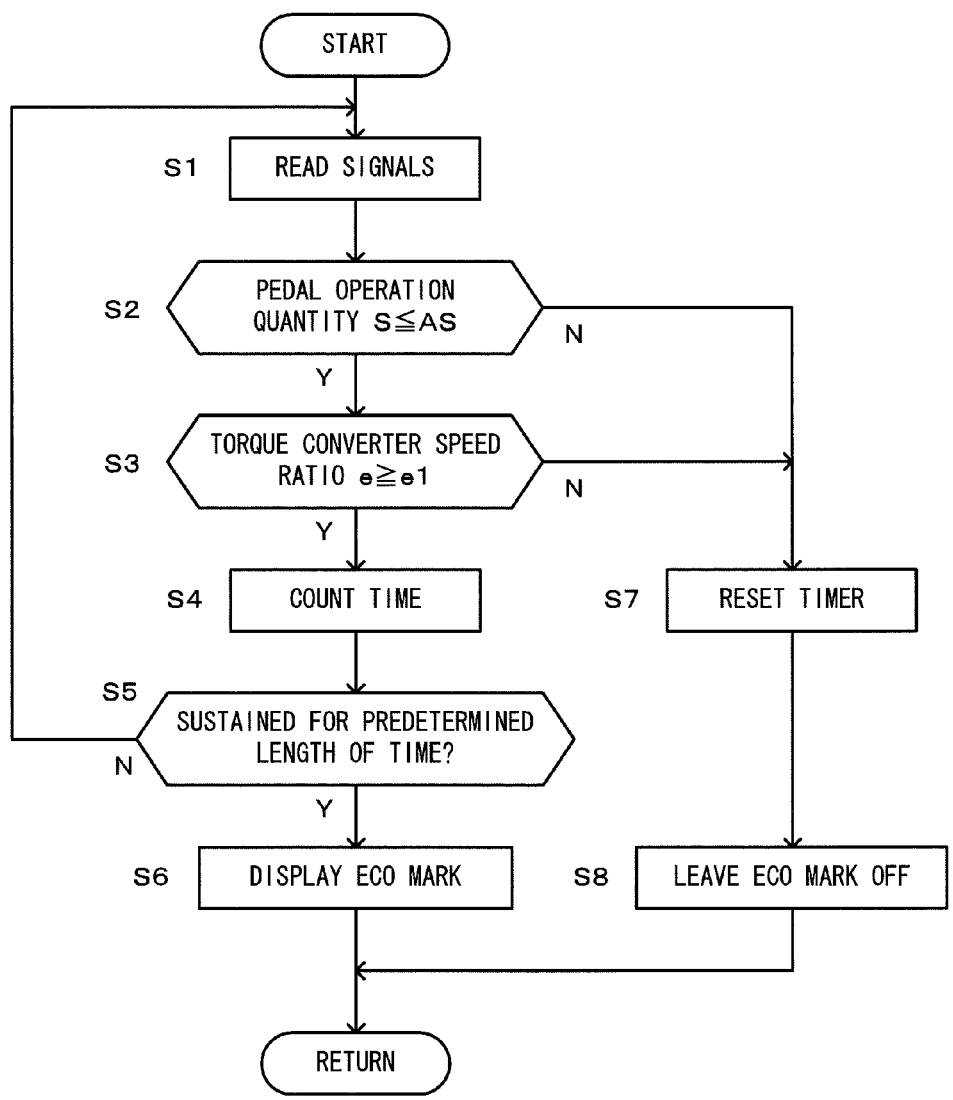

FIG. 9 presents a flowchart of an example of processing that may be executed by the controller 10. The processing in the flowchart may start as, for instance, an engine key switch is turned on. In step S1, the signals provided by the various detectors 12 through 15 and the switches 7 through 9 are read. In step S2, a decision is made as to whether or not the accelerator pedal operation quantity S, detected via the operation quantity detector 12, is equal to or less than the preset value AS, i.e., whether or not the target engine rotation speed is equal to or less than the threshold value Na.

If an affirmative decision is made in step S2, the operation proceeds to step S3, in which a decision is made as to whether or not the torque converter speed ratio e, calculated based upon the values Ni and Nt detected via the rotation speed detector 14 and the rotation speed detector 15 respectively, is equal to or greater than the predetermined value e1. If an affirmative decision is made in step S3, the operation proceeds to step S4 to start counting time on a timer. In step S5, a decision is made as to whether or not the state in which the pedal operation quantity S is equal to or less than the preset value AS and the torque converter speed ratio e is equal to or greater than the predetermined value e1 has been sustained over a predetermined length of time t0, i.e., whether or not a fuel efficiency deteriorating condition exists. If an affirmative decision is made in step S5, it is judged that the fuel efficiency deteriorating condition does not exist and the operation proceeds to step S6, whereas if a negative decision is made in step S5, the operation returns to step S1. In step S6, a control signal is output to the ECO mark display unit 22 to bring up a display of the ECO mark (ECO display).

If, on the other hand, it is decided in step S2 that the pedal operation quantity S is greater than the preset value AS or it is decided in step S3 that the torque converter speed ratio e is less than the predetermined value e1, the fuel efficiency deteriorating condition is judged to exist, and the operation proceeds to step S7. In step S7, the timer is reset. Then, a control signal is output to the ECO mark display unit 22 to turn off the ECO mark display (ECO non-display).

The primary operations executed in the embodiment may be summarized as follows. If the state in which the pedal operation quantity S remains equal to or less than the preset value AS and the torque converter speed ratio e remains equal to or greater than the predetermined value e1 is sustained over the predetermined length of time t0, the ECO mark is displayed at the ECO mark display unit 22 (step S6). With the ECO mark display brought up in this manner the operator is informed that the energy-saving operation is ongoing. If the pedal operation quantity S exceeds the preset value AS while the torque converter speed ratio e remains equal to or greater than the predetermined value e1, the ECO mark is taken off display. This lets the operator know that he is stepping on the accelerator pedal 11 to an excessive extent and thus prompts the operator to switch to energy-saving operation by backing off on the operation of the accelerator pedal 11 so that the accelerator pedal operation quantity is kept equal to or less than the preset value AS.

As the torque converter speed ratio e becomes less than the predetermined value e1 while the vehicle is traveling uphill or is engaged in excavating operation on a steep hill with a high traveling load in second gear, the ECO mark is taken off display even if the pedal operation quantity S is equal to or less than the preset value AS. This lets the operator know that the vehicle is engaged in operation with poor torque converter efficiency η. In response, the operator may shift the gear setting down to first gear by operating the shift switch 8 or the kick-down switch 34, so as to improve the torque converter efficiency η. As the torque conversion efficiency η improves, the ECO mark will be brought up on display to indicate that the energy-saving operation has been resumed.

Namely, when the torque converter efficiency η is low, the motive power loss occurring within the torque converter is significant and the engine 1 consumes fuel at a higher rate. This means that even if the pedal operation quantity S remains equal to or less than the preset value AS, the vehicle is not really engaged in energy-saving operation and that the gear setting needs to be shifted down in order to achieve the energy-saving operation state. In the embodiment, the ECO mark is brought up on display or the ECO mark display is turned off to indicate to the operator whether or not the torque converter efficiency η is poor, which allows the operator to shift the gear setting down with optimal timing and ultimately facilitates energy-saving operation.

The following advantages are achieved through the embodiment.

(1) The ECO mark display at the ECO mark display unit 22 is off if the target engine rotation speed corresponding to the extent to which the accelerator pedal 11 is operated, is greater than the preset value Na or if the target engine rotation speed is equal to or less than the preset value Na but the torque converter speed ratio e is less than the predetermined value e1 (if the fuel efficiency deteriorating condition exists). Thus, the operator is able to ascertain with ease whether or not the vehicle is currently engaged in energy-saving operation and is able to shift into energy-saving operation if necessary. Even when the torque converter speed ratio e is equal to or greater than the predetermined value e1, the fuel efficiency deteriorating condition is judged to exist if the target engine rotation speed corresponding to the extent to which the accelerator pedal 11 is operated, is greater than the preset value Na, and the ECO mark display at the ECO mark display unit 22 is off under such circumstances.

(2) Since the decision as to whether or not the fuel efficiency deteriorating condition exists is made in reference to the extent to which the accelerator pedal 11 is operated and the torque converter speed ratio e and the decision-making results are reflected in the display provided at the ECU mark display unit 22, the operator is prompted to operate the vehicle with better fuel efficiency throughout the entire work operation.

(3) With the ECU mark display brought up depending upon whether or not the fuel efficiency deteriorating condition exists, the operator is able to determine with ease whether or not the vehicle is currently engaged in energy-saving operation.

(4) It is decided that the fuel efficiency deteriorating condition does not exist, i.e., the fuel efficiency deteriorating condition is judged to have cleared, only if the state in which the torque converter speed ratio e remains equal to or greater than the predetermined value e1 and the target engine rotation speed remains above the preset value Na over a period of time longer than the predetermined length of time t0. This means that stable display is provided at the ECO mark display unit 22, enabling the operator to make an accurate decision with regard to whether or not the vehicle is currently engaged in energy-saving operation.

(5) Since the lowest gear setting in the automatic gear shift range is second gear, no automatic downshift is executed to switch from second gear to first gear, thereby assuring better operability.

(6) Since the predetermined value e1 is set so as to assume a lower value than the torque converter speed ratio ed used as the downshift reference value, the ECO mark display is not kept off within the regular automatic gear shift range, as long as the pedal operation quantity S remains equal to or less than the predetermined value AS and instead, the ECO mark display is kept off only if a manual downshift is required.

Second Embodiment

The work vehicle control device achieved in the second embodiment is now described. The work vehicle control device achieved in the second embodiment is distinguishable from the work vehicle control device in the first embodiment only in the processing executed by the controller 10. Since the other structural features of the second embodiment are identical to those of the first embodiment, a repeated explanation is not provided and the following explanation focuses on the processing executed by the controller 10.

Figure 10:
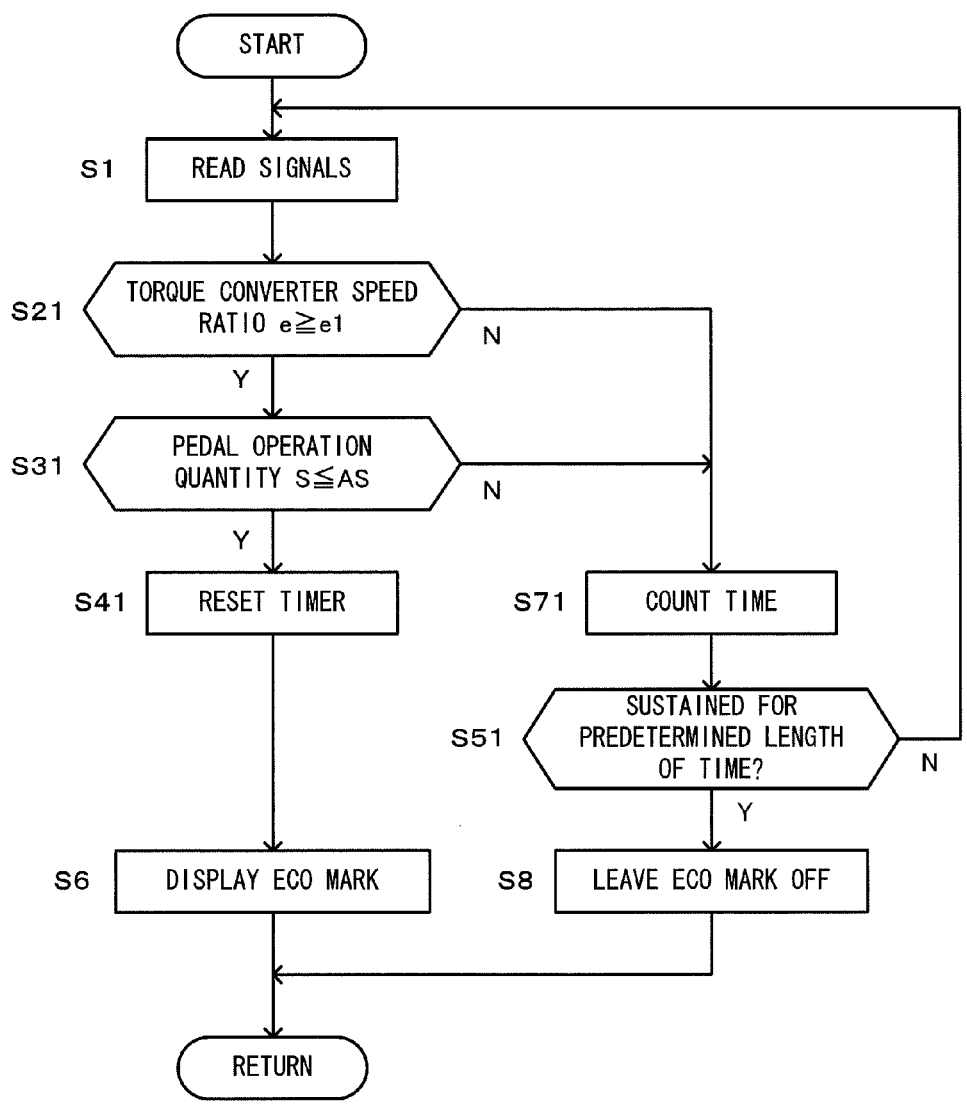
FIG. 10 A flowchart of an example of processing that may be executed by the controller achieved in a second embodiment

FIG. 10 presents a flowchart of the processing executed by the controller 10 in the second embodiment. FIG. 10 corresponds to FIG. 9 pertaining to the first embodiment. In FIG. 10, the same step numbers are assigned to steps in which processing similar to that executed in the first embodiment, as shown in FIG. 9 is executed.

As in the first embodiment, the processing executed as shown in the flowchart starts as, for instance, the engine key switch is turned on. In step S1, the signals provided by the various detectors 12 through 15 and the switches 7 through 9 are read. In step S21, a decision is made as to whether or not the torque converter speed ratio e, calculated based upon the values Ni and Nt detected by the rotation speed detector 14 and the rotation speed detector 15, is equal to or greater than the predetermined value e1.

If an affirmative decision is made in step S21, the operation proceeds to step S31 to make a decision as to whether or not the accelerator pedal operation quantity S, detected by the operation quantity detector 12, is equal to or less than the preset value AS, i.e., whether or not the target engine rotation speed is equal to or less than the threshold value Na. If an affirmative decision is made in step S31, the operation proceeds to step S41. In step S41, the timer is reset. In step S6, a control signal is output to the ECO mark display unit 22 to bring up a display of the ECO mark (ECO display).

If, on the other hand, it is decided in step S21 and that the torque converter speed ratio e is less than the predetermined value e1 or if it is decided in step S31 that the pedal operation quantity S is greater than the preset value AS, the operation proceeds to step S71. In step S71, time is counted on the timer. In step S51, a decision is made as to whether or not the state in which the torque converter speed ratio e remains less than the predetermined value e1 or the state in which the torque converter speed ratio e is equal to or greater than the predetermined value e1 but the accelerator pedal operation quantity S is greater than the preset value AS has been sustained over a predetermined length of time t0. If an affirmative decision is made in step S51, the fuel efficiency deteriorating condition is judged to exist and the operation proceeds to step S8, but if a negative decision is made in step S51, the operation returns to step S1. In step S8, a control signal is output to the ECO mark display unit 22 to leave the ECO mark display off (ECO non-display).

The following advantages are achieved through the embodiment.

(1) If the torque converter speed ratio e is less than the predetermined value e1 or if the torque converter speed ratio e is equal to or greater than the predetermined value e1 and the target engine rotation speed corresponding to the extent to which the accelerator pedal 11 is operated, is greater than the preset value Na (if the fuel efficiency deteriorating condition exists), the ECO mark display at the ECO mark display unit 22 is off. As a result, the operator is able to ascertain with ease whether or not the vehicle is currently engaged in energy-saving operation and is able to shift into energy-saving operation if necessary.

(2) The fuel efficiency deteriorating condition is judged to exist if the state in which the torque converter speed ratio e remains less than the predetermined value e1 is sustained over a period of time equal to or longer than the predetermined time length t0 or if the state in which the torque converter speed ratio e is equal to or greater than the predetermined value e1 and the target engine rotation speed remains higher than the preset value Na is sustained over a period of time equal to or greater than the predetermined time length t0. As a result, stable display is provided at the ECO mark display unit 22, enabling the operator to make an accurate decision as to whether or not the vehicle is currently engaged in energy-saving operation.

In addition to the advantages listed above, advantages similar to those of the first embodiment are achieved through the embodiment.

It is to be noted that while the control device provides information indicating whether or not the fuel efficiency deteriorating condition exists by either displaying the ECO mark or keeping the ECO mark display turned off, at the ECO mark display unit 22 in either of the embodiments described above, an informing means adopting a structure other than that described above may be used to indicate whether or not the fuel efficiency deteriorating condition exists. For instance, a warning sound may be output to indicate that the fuel efficiency deteriorating condition exists. In addition, as long as the fuel efficiency deteriorating condition is judged to exist when the torque converter speed ratio e is less than the predetermined value e1 or when the torque converter speed ratio e is equal to or greater than the predetermined value e1 and the target engine rotation speed remains higher than the preset value Na, processing other than that described above may be executed by the controller 10 functioning as the decision-making means. Namely, the fuel efficiency deteriorating condition may be judged to exist without making a decision as to whether or not a specific state is sustained over a predetermined length of time t. Furthermore, when the fuel efficiency deteriorating condition exists, a message indicating a poor fuel efficiency condition may be displayed or a sound (a voice, an alarm or the like) indicating a poor fuel efficiency condition may be output, instead of turning off the ECO mark display.

While the gear setting at the transmission 3 is adjusted in correspondence to the torque converter speed ratio e in the range of second through fourth gears in the automatic gear shift mode, the automatic gear shift means may adopt a structure different from this. In addition, while the gear setting at the transmission 3 is adjusted within the range of first through fourth gears in response to an operation of the shift switch 8 in the manual gear shift mode, the manual gear shift means adopting a structure other than this may be used in the manual gear shift mode. While a value smaller than the torque converter speed ratio ed used as the downshift reference value is set as the predetermined value e1, the predetermined value e1 may be set to a value other than this.

A rotation speed control means adopting a structure other than that described above may be used, as long as it controls the engine rotation speed in correspondence to the extent to which the accelerator pedal 11 is operated. Furthermore, while the rotation of the engine 1 is transmitted to the tires 6 via the torque converter 2, the transmission 3, the drive shaft 4 and the axles 5, a traveling drive device assuming any structure may be used in conjunction with the present invention. Moreover, while the torque converter speed ratio e is detected based upon the values detected via the rotation speed detectors 14 and 15, a speed ratio detection means adopting a structure other than this may be used in conjunction with the present invention.

While the explanation is given above on an example in which the present invention is adopted in a wheel loader, the present invention is not limited to this example and it may be adopted equally effectively in other types of work vehicles. Namely, as long as the features characterizing the present invention and the functions of the present invention are fulfilled, the present invention is not limited in any way whatsoever to the control devices described in reference to the embodiments.

The disclosure of the following priority application is herein incorporated by reference:

Japanese Patent Application 2009-146199, filed Jun. 19, 2009

The invention claimed is:

1. A work vehicle control device, comprising a controller configured to:
control a rotation speed of an engine in correspondence to an accelerator pedal operation quantity indicating an extent to which an accelerator pedal is operated;
detect a torque converter speed ratio of a speed at an input shaft and a speed at an output shaft of a torque converter, which is disposed between the engine and wheels to transmit rotation of the engine to the wheels;
make a decision that a fuel efficiency deteriorating condition exists in the following situations:
  i) a situation in which the torque converter speed ratio is less than a predetermined value, and
  ii) a situation in which the torque converter speed ratio is equal to or greater than the predetermined value and a target engine rotation speed corresponding to an operation of the accelerator pedal is greater than a preset value;
inform an operator within an operator's cab of results of the decision that the fuel efficiency deteriorating condition exists;
set a downshift reference value that is greater than the predetermined value, for the torque converter speed ratio; and adjust a gear setting at a transmission, which is connected to the output shaft of the torque converter, to be shifted down if the torque converter speed ratio decreases to the downshift reference value.

2. A work vehicle control device according to claim 1, further comprising:
a display device at a location within the operator's cab, that displays the results of the decision made by the decision-making unit.

3. A work vehicle control device according to claim 2, wherein:
the controller makes the decision that the fuel efficiency deteriorating condition exists if a state in which the torque converter speed ratio remains less than the predetermined value is sustained over a period of time equal to or longer than a predetermined time length or if a state in which the torque converter speed ratio is equal to or greater than the predetermined value and the target engine rotation speed remains higher than the preset value is sustained over a period of time equal to or greater than a predetermined time length.

4. A work vehicle control device according to claim 2, wherein:
the controller adjusts the gear setting at the transmission over a range in which a gear larger than first gear is set as a minimum gear; and
the controller adjusts the gear setting at the transmission in response to a manual operation over a range that includes first gear and larger gears.

5. A work vehicle control device according to claim 1, wherein:
the controller makes the decision that the fuel efficiency deteriorating condition exists if a state in which the torque converter speed ratio remains less than the predetermined value is sustained over a period of time equal to or longer than a predetermined time length or if a state in which the torque converter speed ratio is equal to or greater than the predetermined value and the target engine rotation speed remains higher than the preset value is sustained over a period of time equal to or greater than a predetermined time length.

6. A work vehicle control device according to claim 5, wherein:
the controller adjusts the gear setting at the transmission over a range in which a gear larger than first gear is set as a minimum gear; and
the controller adjusts the gear setting at the transmission in response to a manual operation over a range that includes first gear and larger gears.

7. A work vehicle control device according to claim 1, wherein:
the controller adjusts the gear setting at the transmission over a range in which a gear larger than first gear is set as a minimum gear; and
the controller adjusts the gear setting at the transmission in response to a manual operation over a range that includes first gear and larger gears.

8. A work vehicle control device, comprising a controller configured to:
control a rotation speed of an engine in correspondence to an accelerator pedal operation quantity indicating an extent to which an accelerator pedal is operated;
detect a speed ratio of a speed at an input shaft and a speed at an output shaft of a torque converter which is disposed between the engine and wheels to transmit rotation of the engine to the wheels;
make a decision whether or not the detected torque converter speed ratio is less than a predetermined value;
make a decision that a fuel efficiency deteriorating condition exists when a decision is made that the detected torque converter speed ratio is less than the predetermined value;
make a decision whether or not a target engine rotation speed corresponding to an operation of the accelerator pedal is greater than a preset value when a decision has been made that the detected torque converter speed ratio is equal to or greater than the predetermined value;
make a decision that the fuel efficiency deteriorating condition exists when a decision is made that the target engine rotation speed corresponding to an operation of the accelerator pedal is greater than a preset value; and
inform an operator within an operator's cab of results of the decision that the fuel efficiency deteriorating condition exists.

9. A work vehicle control device, comprising a controller configured to:
control a rotation speed of an engine in correspondence to an accelerator pedal operation quantity indicating an extent to which an accelerator pedal is operated;
detect a speed ratio of a speed at an input shaft and a speed at an output shaft of a torque converter which is disposed between the engine and wheels to transmit rotation of the engine to the wheels;
make a decision whether or not a target engine rotation speed corresponding to an operation of the accelerator pedal is greater than a preset value;
make a decision that a fuel efficiency deteriorating condition exists when a decision is made that the target engine rotation speed corresponding to an operation of the accelerator pedal is greater than the preset value;
make a decision whether or not the detected torque converter speed ratio is less than a predetermined value when a decision has been made that the target engine rotation speed corresponding to an operation of the accelerator pedal is equal to or less than the preset value;
make a decision that the fuel efficiency deteriorating condition exists when a decision is made that the detected torque converter speed ratio is less than the predetermined value; and
inform an operator within an operator's cab of results of the decision that the fuel efficiency deteriorating condition exists.

* * * * *